UNITED STATES PATENT OFFICE 2,617,793

METHOD OF PREPARING AMIDES

Richard W. Young, Stamford, Conn., assignor to American Cyanamid Company, New York, N. Y., a corporation of Maine No Drawing. Application December 1, 1950, Serial No. 198,721

15 Claims. (Cl. 260—112)

This invention relates to a new method of organic synthesis, and more particularly to a new method of preparing amides and peptides.

Although there are many methods available for preparing substituted amides, none have proved quite satisfactory in all instances. It is an object of this invention to make available a new method for preparing substituted amides which overcomes many of the difficulties of the prior art. A further object of this invention is to make available a method of preparing amides containing sensitive groups which ordinarily interfere with the synthesis of amides. Another object of this invention is to make available a method of preparing substituted amides from optically active components without undue racemization.

The new method of this invention comprises reacting an amine having active hydrogen with a mixed anhydride of a diester of phosphorous acid and a carboxylic acid. These mixed anhydrides may be represented by the formula:

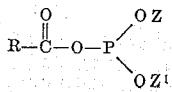

in which

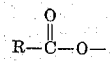

represents an organic radical derived from a carboxylic acid, and Z and Z' represent nonfunctional esterifying radicals. The term "nonfunctional esterifying radical" is used to signify an organic radical which does not enter into the usual chemical reactions of the mixed anhydride and the variation of which does not materially affect the chemical properties of the anhydride. Examples of suitable radicals may be illustrated by the following: aromatic such as phenyl, napthyl, chlorophenyl, nitrophenyl; aliphatic such as ethyl, propyl, butyl, chlorobutyl, and the like; etc. One skilled in the art of organic synthesis should have little difficulty choosing suitable radicals for Z and Z'.

Mixed anhydrides of the above formula constitute the subject matter of my co-pending application S. N. 198,722 filed concurrently herewith and may be prepared by the procedure set forth therein. The mixed anhydride of any monobasic or polybasic carboxylic acid is suitable for the process of this invention.

The reaction is believed to take place (in the case of a primary amine) according to the following equation in which R' is an organic radical and R, Z, and Z' are as defined above.

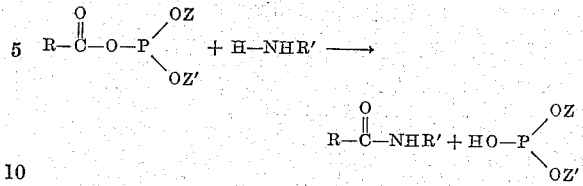

The reaction is the same for secondary amines except that the disubstituted amide is produced. Thus it will be seen that the method is a general method whereby the mono and disubstituted amides of carboxylic acids may be prepared.

Any amine which has amine hydrogen is suitable for the process of the invention. Such amines may be illustrated by the following: primary aliphatic amines such as methylamine, ethylamine, propylamine, butylamine, hexylamine, allylamine, and the like; secondary aliphatic amines such as dimethylamine, dibutylamine, and the like; substituted aliphatic amines such as chloroethylamine, phenethylamine, benzylamine, and the like; aromatic amines such as aniline, naphthylamine, and the like; substituted aromatic amines such as m-toluidine, p-benzylaniline, o-chloroaniline, 2,4 - dibromo - 6 - nitroaniline, and the like; secondary mixed aliphatic-aromatic amines such as N-allylaniline, benzylaniline, and the like; cyclic amines such as piperidine, morpholine, and the like; heterocyclic amines such as aminopyrimidine, and the like; diamines such as butylenediamine, diethylenediamine and the like; etc. In the case of diamines, etc., the monoacylated or the polyacylated derivative can be formed depending upon the number of molecular equivalents of mixed anhydride employed.

The method of this invention is of particular interest in the preparation of amides from the naturally occurring aminoacids. According to many of the methods of the prior art when amides were made of the optically active acids, a large amount of racemization occurred, but by the method of this invention, very little difficulty is encountered. The aminoacid may constitute either the acid from which the mixed anhydride is formed or the amine which is reacted with the mixed anydride to form the substituted amide. (As explained in my co-pending application, S. N. 198,722, when the aminoacids are employed in making the mixed anhydrides, it is advantageous to block the amino group and other secondary reactive groups by acylation or substitution.)

Aminoacids which are of particular interest in connection with the process of this invention may be illustrated by the following: alanine, valine, norvaline, leucine, norleucine, isoleucine, isovaline, phenylalanine, tyrosine, serine, cysteine, methionine, aspartic acid, glutamic acid, lysine, ornithine, asparagine, citrulline, histidine, tryptophane, proline, and hydroxyproline. Generally speaking these aminoacids are alpha aminoacids having from two to twelve carbon atoms.

In the synthesis of peptides by the method of this invention, it is advantageous to react the mixed anhydride with an aminoacid ester rather than the free aminoacid. If the free peptide acid is desired, it can be obtained by first forming the peptide ester and then removing the ester group by hydrolysis.

The method offers a very convenient means of preparing long chain polypeptides. For instance, a dipeptide derivative may be prepared according to the procedure set forth above, a mixed anhydride of the dipeptide prepared according to the procedure of my co-pending application S. N. 198,722, the mixed anhydride reacted with an aminoacid ester to obtain the tripeptide derivative, and so on. The method is also of particular interest in preparing substituted amides from compounds having sensitive groups, such as the aldehyde or keto group, since other methods usually result in the destruction of such groups.

The reaction is preferably performed in an inert solvent. Suitable inert solvents may be illustrated by the following: aromatic hydrocarbons such as xyline, toluene; aliphatic hydrocarbons such as normal octane, etc.; chlorinated hydrocarbons, such as chloroform, carbon tetrachloride, chlorobenzene, etc.; aliphatic ethers such as ethyl ether, butyl ether and the like; cyclic ethers such as dioxane and the like; and with less satisfactory results, aliphatic ketones such as dibutyl ketone and aliphatic esters, such as ethyl acetate, etc. Choice of solvent will depend primarily upon the solubility of the reactants therein and upon convenience. The aromatic hydrocarbons are preferred. When an inert solvent is employed, the mixed anhydride may be formed in situ without the need of isolation.

The reaction may be carried out at room temperature or at any other temperature below the decomposition point of the reactants or reaction product. Usually, however, one is limited as a matter of convenience to the reflux temperature of the solvent employed and temperatures in the range of 40–115° C. are preferred. The reaction proceeds immediately at room temperature and is substantially complete in about twelve hours. The reaction is usually complete in about ten minutes to one-half hour at 80° C., and in a proportional length of time at intermediate temperatures.

The reaction will be more particularly illustrated by means of the following specific examples:

*Example I*

Silver carbobenzoxyglycinate (6.5 g.) is suspended in 200 cc. of carbon tetrachloride and treated for forty-five minutes at room temperature with 3.5 g. of diethylchlorophosphite. The precipitate of silver chloride is removed by filtration leaving a solution of the mixed anhydride of phosphorous acid diethyl ester and carbobenzoxyglycine.

To the filtered solution of the mixed anhydride is added 1.86 g. of aniline and the solution refluxed for one hour. The solution is then concentrated to precipitate about 1.25 g. (22% of theoretical) of carbobenzoxyglycineanilide having a melting point of 148° C.–149° C.

*Example II*

To a solution of 4.18 g. of carbobenzoxyglycine in about 75 cc. of benzene, there is added 2.02 g. of triethylamine and 3.5 g. of diethylchlorophosphite. A quantitative yield of triethylamine hydrochloride is precipitated and removed by filtration leaving a solution of the mixed anhydride of phosphorous acid diethyl ester and carbobenzoxyglycine.

To the filtered solution of the mixed anhydride there is added 1.86 g. of aniline and the solution refluxed for two and one-half hours. Upon cooling, there is precipitated about 4.61 g. (81%) of white crystals of carbobenzoxyglycineanilide. By concentrating the solution by evaporation of the benzene solvent, another 0.4 g. of the anilide is obtained. Total yield is 88% of theoretical.

*Example III*

A solution of 4.18 g. of carbobenzoxyglycine, 1.86 g. of aniline, 4.04 g. of triethylamine and 3.5 g. of diethylchlorophosphite in 100 cc. of benzene is heated at reflux for two and one-half hours. After hot filtration, the benzene solution is cooled and 3.1 g. of a white solid is obtained which when crystallized from alcohol-water gives 1.3 g. (23%) of carbobenzoxyglycineanilide, M. P. 147°–148° C.

*Example IV*

In about 75 cc. of toluene there is dissolved 4.18 g. of carbobenzoxyglycine. To this solution there is added 2.02 g. of triethylamine and 3.05 g. of diethylchlorophosphite. The precipitate of triethylamine hydrochloride is removed by filtration leaving a solution of the mixed anhydride of phosphorous acid diethyl ester and carbobenzoxyglycine.

A solution of 3.15 g. of DL-phenylalanine ethyl ester in 10 cc. of toluene was added to the filtered solution of the mixed anhydride. This was then refluxed for one and one-half hours. The toluene was then removed by passing nitrogen gas through the solution, leaving a white solid residue. The residue is crystallized from ethyl acetate-petroleum ether to obtain 7 g. (92%) of carbobenzoxyglycine - DL - phenylalanine ethyl ester; M. P. 91°–92° C.

*Example V*

In about 25 cc. of dry toluene there is dissolved 3.63 g. of carbobenzoxy-DL-alanine and 1.66 g. of triethylamine. To this solution there is added 3.5 g. of diethylchlorophosphite. The quantitative precipitate of triethylamine hydrochloride is removed by filtration leaving a solution of the mixed anhydride of phosphorous acid diethyl ester and carbobenzoxy-DL-alanine.

To the filtered solution of the mixed anhydride there is added 3.05 g. of DL-phenylalanine ethyl ester, and the solution refluxed for one and one-third hours. Concentration by evaporation gives about 7.0 g. (88%) of carbobenzoxy-DL-alanyl-DL-phenylalanine ethyl ester. After recrystalization from ethyl acetate-petroleum ether there is obtained 2.0 g. of white crystals; M. P. 120–121° C.

*Example VI*

In 50 cc. of toluene there is dispersed 2.72 g. of phthalylglycyl-DL-alanine and 1.20 g. of triethylamine. To this mixture there is added 1.54 g. of diethylchlorophosphite and the mixture stirred for approximately fifteen minutes. The precipitate of triethylamine hydrochloride is removed by filtration leaving a solution of the mixed anhydride of phosphorous acid diethyl ester and phthalylglycyl-DL-alanine.

To the solution of the mixed anhydride there is added 1.90 g. of DL-phenylalanine ethyl ester and the solution refluxed for one and one-third hours. After allowing the solution to cool to room temperature, the solid precipitate is removed by filtration. The filtrate is concentrated by evaporation under vacuum to obtain additional solids, giving a total yield of 3.2 g. (71%) of phthalylglycyl-DL-alanyl-DL-phenylalanine ethyl ester, which after two recrystallizations from ethyl acetate-petroleum ether and two recrystallizations from alcohol melted at 186–190° C.

Example VII

Carbobenzoxy-L-phenylalanine (2.99 g.) and 1.01 g. of triethylamine are dissolved in 25 cc. of dioxane and the solution cooled to room temperature. To the cooled solution is then added 1.56 g. of diethylchlorophosphite and the resulting precipitate of triethylamine hydrochloride removed by filtration leaving a solution of the mixed anhydride of phosphorous acid diethyl ester and carbobenzoxy-L-phenylalanine.

To one-half of the mixed anhydride solution there is added 0.34 g. of 95% hydrazine and the solution refluxed for two hours. To this solution water is added until cloudiness is observed and the resulting precipitate of 1.63 g. (87%) of L-carbobenzoxyphenylalanine hydrazide removed by filtration. The compound has a M. P. of 167.5–168.5° C.

Example VIII

To a benzene solution of the mixed anhydride of L-dicarbobenzoxylysine and phosphorous acid diethyl ester prepared according to the procedure of Example III from 2.63 g. of dicarbobenzoxylysine, there is added .32 g. of 95% hydrazine. The solution is refluxed for one and one-half hours and treated according to the procedure of Example VII to obtain 2.5 g. (90%) of dicarbobenzoxy-L-lysylhydrazide; M. P. 160–161° C.

Example IX

Glycine ethyl ester is prepared by reacting 7.5 g. of glycine ethyl ester hydrochloride in 90 cc. of chloroform with 5.0 g. of triethylamine. To this solution there is added, 70 cc. of benzene and the triethylamine hydrochloride precipitate removed by filtration. This benzene-chloroform solution of glycine ethyl ester is added to a benzene solution of mixed anhydride from 21 g. of L-dicarbobenzoxylysine prepared according to the procedure of Example VIII and the resulting solution refluxed for one hour. Concentration and precipitation with water gives an almost quantitative yield of dicarbobenzoxy-1-lysylglycine ethyl ester, which after three recrystallizations from ethyl acetate-petroleum ether has a melting point 89–90° C.

Example X

One molecular equivalent of butyric acid is mixed with one molecular equivalent of triethylamine and one molecular equivalent of diethylchlorophosphite. The resulting mixed anhydride is separated from the precipitate of triethylamine hydrochloride by filtration.

The mixed anhydride of butyric acid and phosphorous acid dibutyl ester is treated with one molecular equivalent of aniline, and allowed to stand for fifteen hours at room temperature. This reaction mixture is then washed with dilute acid, dilute base and water. Concentration by evaporation results in crystalline butyranilide, M. P. 90–92° C.

Example XI

In 50 cc. of benzene there are dissolved 2.42 g. of benzoic acid and 2.0 g. of triethylamine. To this solution is then added 3.1 g. of diethylchlorophosphite and the resulting precipitate of triethylamine hydrochloride removed by filtration to obtain a solution of the mixed anhydride of benzoic acid and phosphorus acid diethyl ester.

To the mixed anhydride solution there is added 2.8 g. of phenylhydrazine hydrochloride followed by the addition of 1.0 g. of triethylamine in a few cc. of chloroform. The resulting solution is washed with water and the organic layer concentrated by evaporation on a steam bath. The concentrate is dissolved in 5 cc. of alcohol and water added to obtain a precipitate of 1 g. (48%) of benzoylphenylhydrazine, M. P. 166–167° C.

Example XII

A benzene solution of the mixed anhydride of acetic and phosphorous acid diethyl ester was prepared according to the procedure of Example XI from 1.20 g. of glacial acetic acid, and this solution treated with 1.86 g. of aniline. The resulting solution is refluxed for approximately thirty minutes on a steam bath and then concentrated by evaporation of the solvent. The resulting solids are dissolved in water and treated with activated carbon (Darco). By concentration and cooling there is obtained 1.6 g. of acetanilide as flat platelets, M. P. 113–114° C.

Example XIII

In approximately 25 cc. of dioxane there is dissolved 1.46 g. of adipic acid and 2.02 g. of triethylamine. To this solution there is added 3.02 g. of diethylchlorophosphite with cooling and the resulting precipitate of triethylamine hydrochloride removed by filtration to obtain a solution of the mixed dianhydride of adipic acid and phosphorous acid diethyl ester.

To the mixed anhydride solution there is added 1.86 g. of aniline and the solution refluxed for one hour. By cooling the solution there is precipitated 2.4 g. of crystalline adipic acid dianailide, M. P. 245–246° C. By concentration of the mother liquor another 0.2 g. of amide is obtained, making a total yield of approximately 83%.

Example XIV

A solution of the mixed mono-anhydride of adipic acid and phosphorous acid diethyl ester is prepared according to the procedure of Example XIII from 1.46 g. of adipic acid and 1.5 g. of diethylchlorophosphite and to this solution there is added 0.93 g. of aniline. The solution is then refluxed for approximately one-half hour and allowed to cool, whereupon there is precipitated 0.3 g. of solid which includes 0.1 g. (5%) of adipic acid mono-anilide, M. P. 153–155° C.

Example XV

To approximately 5 cc. of toluene there is added 0.25 g. of triethylamine and 0.52 g. of carbobenzoxyglycine. To this solution there is added 0.52 g. of dibutylchlorophosphite and the resulting precipitate of triethylamine hydrochloride removed by filtration to obtain a solution of the mixed anhydride of carbobenzoxyglycine and phosphorous acid dibutyl ester.

To the mixed anhydride solution there is added 0.23 g. of aniline, the solution refluxed five minutes and then chilled in an ice bath. A precipitate of 0.52 g. of white crystals is obtained. The filtrate yielded another 0.15 g. of solid after slight concentration, making a total yield of 94% of carbobenzoxyglycine anilide, M. P. 147–148° C.

*Example XVI*

A solution of the mixed anhydride of carbobenzoxyglycine and phosphorous acid diphenyl ester is prepared according to the procedure of Example XV from 0.7 g. of diphenyl chlorophosphite and 0.52 g. of carbobenzoxyglycine. To the mixed anhydride solution there is added 0.25 g. of aniline and the solution allowed to stand at room temperature for twenty-four hours, during which time there is precipitated 0.4 g. (56%) of carbobenzoxyglycine-anilide, M. P. 147–148° C.

*Example XVII*

A benzene solution of the mixed anhydride of carbobenzoxyglycine and phosphorous acid diethyl ester is prepared according to the procedure of Example XV from 2.09 g. of carbobenzoxyglycine. To the mixed anhydride solution there is added a benzene-chloroform solution of glycylglycine ethyl ester prepared from 1.97 g. of glycylglycine ethyl ester hydrochloride by treatment with triethylamine in chloroform, precipitation of triethylamine hydrochloride by the addition of benzene and removal of the triethylamine hydrochloride by filtration. The resulting solution is concentrated to obtain a rusty yellow solid which is subsequently dissolved in alcohol and treated with activated carbon (Darco). By the addition of water to the alcohol solution there is precipitated 1.8 g. of amorphous gum, and by concentration of the filtrate there is obtained another 1.0 g. of solid, M. P. 161–167° C. The solids are combined and recrystallized from 20 cc. of hot alcohol to obtain 1.5 g. (43%) of carbobenzoxyglycylglycylglycine ethyl ester, M. P. 165–167° C.

*Example XVIII*

To about 75 cc. of benzene there is added .02 mole of carbobenzoxyglycine, .02 mole of triethylamine and .02 mole of o-phenylene chlorophosphite. The precipitate of triethylamine hydrochloride is removed by filtration leaving a solution of the mixed anhydride of phosphorous acid o-phenylene diester and carbobenzoxyglycine.

To the filtered solution of the mixed anhydride there is added .02 mole of aniline and the solution refluxed for approximately two hours. Upon cooling, white crystals of carbobenzoxyglycineanilide are precipitated and removed by filtration.

I claim:

1. A method of preparing substituted amides which comprises reacting an amine having amine hydrogen with a mixed anhydride of a carboxylic acid and a diester of phosphorous acid.

2. The method of claim one when the reaction is performed in an inert organic solvent.

3. The method of claim one when the reaction is performed in an anhydrous inert solvent comprising an aromatic hydrocarbon.

4. A method of preparing substituted amides which comprises reacting an amine having amine hydrogen with a mixed anhydride of a diester of phosphorous acid and an α-acidamido-carboxylic acid.

5. The method of claim four in which said mixed anhydride is a mixed anhydride of phosphorous acid diethyl ester and carbobenzoxyglycine.

6. A method of preparing carbobenzoxyglycineanilide which comprises reacting aniline in an inert aromatic hydrocarbon solvent at a temperature between 0° C. and 140° C. with the mixed anhydride of phosphorous acid diethyl ester and carbobenzoxyglycine.

7. A method of preparing peptide derivatives which comprises reacting, in an anhydrous inert organic solvent, an amino-acid ester with a mixed anhydride of a diester of phosphorous acid and an α-acidamidocarboxylic acid.

8. The method of claim seven wherein said aminoacid ester is an ester of phenylalanine and said mixed anhydride is a mixed anhydride of a diester of phosphorous acid and a derivative of alanine.

9. The method of claim seven wherein said aminoacid ester is an ester of glycine and said mixed anhydride is a mixed anhydride of a phosphorous acid diethyl ester and a derivative of phenylalanine.

10. A method of preparing carbobenzoxyalanylphenylalanine ethyl ester which comprises reacting, in an inert organic solvent at a temperature between 40° C. and 115° C., phenylalanine ethyl ester and the mixed anhydride of phosphorous acid diethyl ester and carbobenzoxyalanine.

11. A method of preparing optically active substituted amides which comprises reacting, in an inert solvent at a temperature between 40° C. and 115° C., an amine having amine hydrogen with a mixed anhydride of a diester of phosphorous acid and an optically active α-acidamidocarboxylic acid.

12. The method of claim eleven when said mixed anhydride is a mixed anhydride of a diester of phosphorous acid and a derivative of L-phenylalanine.

13. The method of claim eleven when said mixed anhydride is a mixed anhydride of a diester of phosphorous acid and a derivative of L-lysine.

14. A method of preparing optically active peptide derivatives which comprises reacting, in an inert solvent at a temperature between 40° C. and 115° C., an aminoacid ester with a mixed anhydride of a diester of phosphorous acid and an optically active α-acidamidocarboxylic acid.

15. The method of claim fourteen when said aminoacid ester is an ester of glycine and said said mixed anhydride is a mixed anhydride of phosphorous acid diethyl ester and a derivative of L-lysine.

RICHARD W. YOUNG.

REFERENCES CITED

The following references are of record in the file of this patent:

Chantrenne: Nature, vol. 164, pp. 576–577 (1949).

Sheehan et al.: J. Am. Chem. Soc., vol. 72, pp. 1312–1316 (Mar. 1950).

Brooks: J. Am. Chem. Soc., vol. 34, pp. 492–499 (1912).